(12) United States Patent
Mills et al.

(10) Patent No.: US 9,324,027 B2
(45) Date of Patent: Apr. 26, 2016

(54) COLLECTIVE EVALUATION OF ALTERNATIVES IN A COLLABORATIVE DECISION MAKING ENVIRONMENT

(71) Applicant: International Business Machines Corporation, Armonk, NY (US)

(72) Inventors: Nathaniel Mills, Coventry, CT (US); Bonnie K. Ray, Nyack, NY (US); Jesus M. Rios Aliaga, Peekskill, NY (US); Steven I. Ross, South Hamilton, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 281 days.

(21) Appl. No.: 13/953,926

(22) Filed: Jul. 30, 2013

(65) Prior Publication Data

US 2015/0039548 A1  Feb. 5, 2015

(51) Int. Cl.
*G06N 5/04* (2006.01)

(52) U.S. Cl.
CPC .................................. *G06N 5/04* (2013.01)

(58) Field of Classification Search
None
See application file for complete search history.

(56) References Cited

U.S. PATENT DOCUMENTS

| 8,274,377 | B2 | 9/2012 | Smith et al. | |
| 8,732,101 | B1* | 5/2014 | Wilson et al. | 706/15 |
| 2003/0069870 | A1* | 4/2003 | Ras et al. | 706/54 |
| 2003/0078900 | A1 | 4/2003 | Dool | |
| 2007/0198223 | A1* | 8/2007 | Ella et al. | 702/188 |
| 2009/0063379 | A1* | 3/2009 | Kelly | 706/46 |
| 2009/0078900 | A1* | 3/2009 | Smith | 251/129.15 |
| 2010/0145715 | A1* | 6/2010 | Cohen | 705/1.1 |
| 2012/0047146 | A1* | 2/2012 | Balakrishnan et al. | 707/748 |

OTHER PUBLICATIONS

Sanayei, A.S. et al. "Group decision making process for supplier selection with VIKOR under fuzzy environment." Expert Systems with Applications 37, No. 1 (2010): 24-30. doi:10.1016/j.eswa.2009.04.063.*

Davis, J.P. et al. "A software-supported process for assembling evidence and handling uncertainty in decision-making." Decision Support Systems 35, No. 3 (2003): 415-433. doi:10.1016/S0167-9236(02)00117-3.*

Karacapilidis, N. et al. "Computer supported argumentation and collaborative decision making: the HERMES system." Information systems 26, No. 4 (2001): 259-277. doi:10.1016/S0306-4379(01)00020-5.*

(Continued)

*Primary Examiner* — Stanley K Hill
*Assistant Examiner* — Benjamin Buss
(74) *Attorney, Agent, or Firm* — Scully, Scott, Murphy & Presser, P.C.; Daniel P. Morris, Esq.

(57) ABSTRACT

A system, method and computer program product for facilitating collaborative decision making may be provided. The system receives data representing individual postings of users associated with a deliberation to make a decision. The system further receives ratings associated with the individual postings in order to make the decision. The system represents the received data in a hierarchical data structure. The system aggregates, through the hierarchical data structure, the ratings associated with the individual postings to obtain strength values. The system facilitates the making of the decision based on the aggregated strength values.

21 Claims, 9 Drawing Sheets

(56) References Cited

OTHER PUBLICATIONS

Saaty, T.L. "Decision making—the Analytic Hierarchy and Network Processes (AHP/ANP)." Journal of Systems Science and Systems Engineering. Mar. 2004, vol. 13, Issue 1, pp. 1-35. DOI:10.1007/s11518-006-0151-5.*

Kim, S.-H. et al. "Group decision making procedure considering preference strength under incomplete information." Computers & Operations Research 24.12 (1997): 1101-1112. doi:10.1016/S0305-0548(97)00037-3.*

Ahmed, A. et al. "Application of Analytical Hierarchy Process and Bayesian Belief Networks for Risk Analysis." Jan. 2005. 10 pages.*

Hsu, H.-M. "Aggregation of fuzzy opinions under group decision making." Fuzzy Sets and Systems. vol. 79, Issue 3, May 13, 1996, pp. 279-285. doi:10.1016/0165-0114(95)00185-9.*

Lai, V.S. et al. "Group decision making in a multiple criteria environment: A case using the AHP in software selection." European Journal of Operational Research 137, No. 1 (2002): 134-144. doi:10.1016/S0377-2217(01)00084-4.*

Dolan, J.G. "Shared decision-making—transferring research into practice: the Analytic Hierarchy Process (AHP)." Patient education and counseling 73, No. 3 (2008): 418-425. doi:10.1016/j.pec.2008.07.032.*

Decision Lens, "A New Paradigm for Decision Making in the Pharma, Biotech, and Life Sciences Industries," Decision Lens Proprietary Information, Mar. 2011, pp. 2-13, Arlington, VA.

Brevins et al., "Data Enabled Collaborative Decision-Making: A Guide for Next Generation Enterprise Decision Processing," Moxie Insight, 2010, pp. 2-28.

Jelasity et al., "Epidemic-Style Proactive Aggregation in Large Overlay Networks," Proceedings of the IEEE International Conference on Distributed Computing Systems, Mar. 2004, pp. 102-109, IEEE Computing Society.

* cited by examiner

COLLECTIVE EVALUATION OF ALTERNATIVES IN A COLLABORATIVE DECISION MAKING ENVIRONMENT

BACKGROUND

This disclosure relates generally to decision making, and particularly to decision making by using a collaborative decision making environment.

BACKGROUND OF THE INVENTION

Collaborative decision making is a process by which users collectively make a decision among alternatives. The made decision is not from a single user but from contributions of all the users. The made decision may be different from a decision of each user. A decision made through the collaborative decision making process may be more effective in encouraging all the users to follow the made decision.

SUMMARY

There are described a system, a method and a computer program product for collaborative decision making. The system receives data representing individual postings of users associated with a deliberation to make a decision. The system further receives ratings associated with the individual postings in order to make the decision. The system represents the received data in a hierarchical data structure. The system computes, e.g., aggregates, through the hierarchical data structure, strength values of the individual postings. The system facilitates the collaborative making of the decision based on the system's organization of the ideas and arguments and computation of the aggregated strength values.

In order to aggregate the strength values, the system accumulates strength values of corresponding child nodes in the hierarchical data structure to determine a strength value of a node in the hierarchical data structure.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 4 illustrates an example screenshot that depicts example individual postings and corresponding example strength values in one embodiment;

FIG. 5 illustrates another example screenshot that depicts example individual postings and corresponding example strength values in one embodiment;

DETAILED DESCRIPTION

Figure 1:
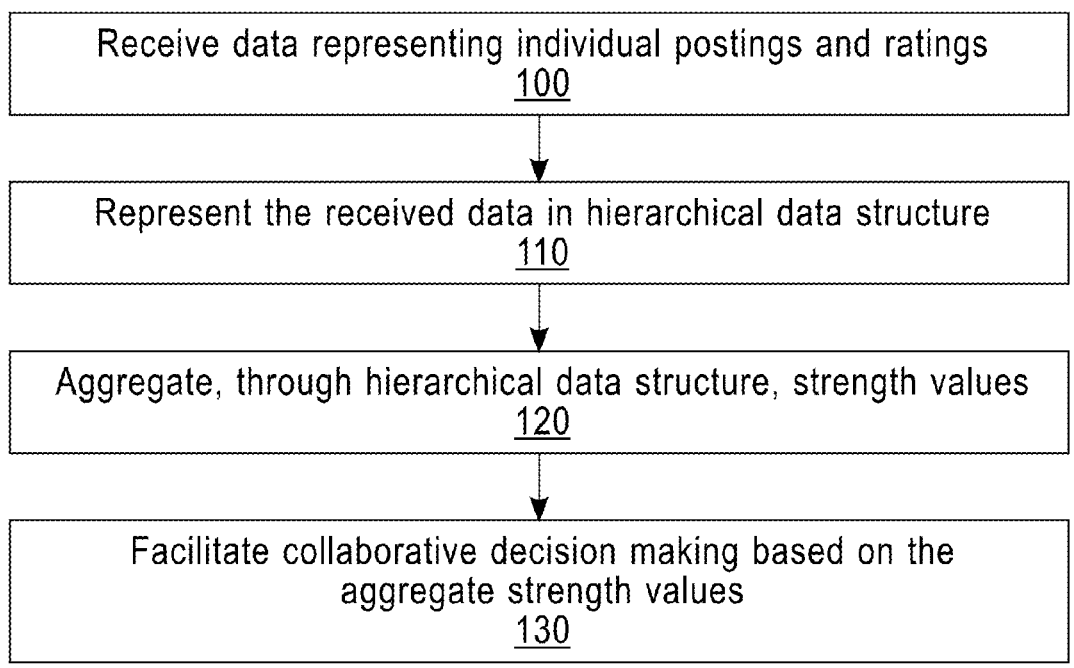
FIG. 1 illustrates a flowchart that describes a method for a collaborative decision making in one embodiment.

There are described a method, a system and a computer program product for collaborative decision making. In one embodiment, the system, e.g., a system 600 shown in FIG. 6, performs collecting issues, ideas (alternatives), and arguments drawn from a group discussion and represents them in a hierarchical data structure. In a traditional collaborative decision making system, as the number of arguments increases and/or as the number of participants in a corresponding decision making process grows, it becomes increasingly difficult for participants to comprehend an entire deliberation of the decision making. In contrast, the system 600 identifies the most supported idea based on aggregated strength values as described in detail below. The system 600 also identifies, based on a corresponding strength value of each argument, the most compelling supporting arguments and the most compelling opposing argument. An argument with a high strength value is a compelling argument and an argument with a low strength value is not a compelling argument. A supporting argument is one which tends to bolster the strength of the item it is arguing for, while an opposing argument is one which tends to lower the strength of the item it is arguing against. Hence a compelling support argument would have a high strength value and would increase the strength of the solution or claim it was arguing for, while a compelling opposing argument, which would also have a high strength value, would tend to lower the strength value of the solution or claim it is arguing against.

The system 600 may improve the quality of a group debate by allowing users to get a better overall understanding of the state of the deliberation of a corresponding group decision making through the aggregated strength value of each argument or each idea. The system 600 enables the users to evaluate how their individual postings and/or ratings are used to contribute to the final made decision, e.g., by showing an aggregated strength value of each idea which accumulates individual strength values. The system 600 collects, aggregates, and/or propagates ratings of ideas or arguments and enables a collective evaluation of ideas, e.g., by aggregating strength values provided by a plurality of users.

The system 600 provides an environment in which users continuously enter their individual postings and/or their ratings about arguments and ideas, i.e., alternatives. The system 600 aggregates the strength values in order to provide an immediate feedback to a team or group about alternatives and/or arguments. The system 600 maintains the individual postings, e.g., in a database (not shown). The system 600 identifies an individual posting that substantially affects an aggregated strength value of an idea or an argument. For example, an argument that has the largest number of supporting sub-arguments (i.e., an argument that is a reply to another argument with positive rating on that another argument) that reply to that former argument would be that individual posting that substantially affects the aggregated strength value of a corresponding idea. By viewing the aggregated strength value of an idea or an argument, users who disagree with that idea or that argument may decide to participate in the deliberation of a corresponding decision making, e.g., by posting their individual postings and ratings. The system 600 continuously aggregates strength values driven by one or more of: (1) when a new user adds a new rating corresponding to an idea or an argument; (2) when a user adds or deletes his/her idea or argument which may cause a change in a data structure representing ideas or arguments. This is described in detail in FIG. 6 and below.

FIG. 1 illustrates a flowchart for a collaborative decision making in one embodiment. At 100, the system 600 receives as input data representing individual postings of users, each of which is associated with a deliberation to make a decision. The system 600 further receives ratings associated with the individual postings in order to make the decision. An individual posting represents an issue, and idea, or an argument. Postings may be connected to other postings by a relation. An issue may be connected to one or more ideas, an idea may be connected to one or more arguments, and an argument may also be connected to other (sub) arguments. The relations that connect postings have a type that indicates the nature of the connection. A relation connecting an idea to an issue has a type indicating that the idea is a proposed resolution to the issue. A relation connecting an argument to an idea or other argument contains a type indicating that the argument either supports or rebuts that idea. A rating may represent one or more of: (a) an overall evaluation of the quality and appropriateness of a corresponding idea by a corresponding user; (b) corresponding user's degree of belief in truth or falseness of a corresponding argument, a corresponding sub-argument or corresponding idea; or (c) a corresponding user's evaluation of the relevance of a corresponding argument.

Figure 7:
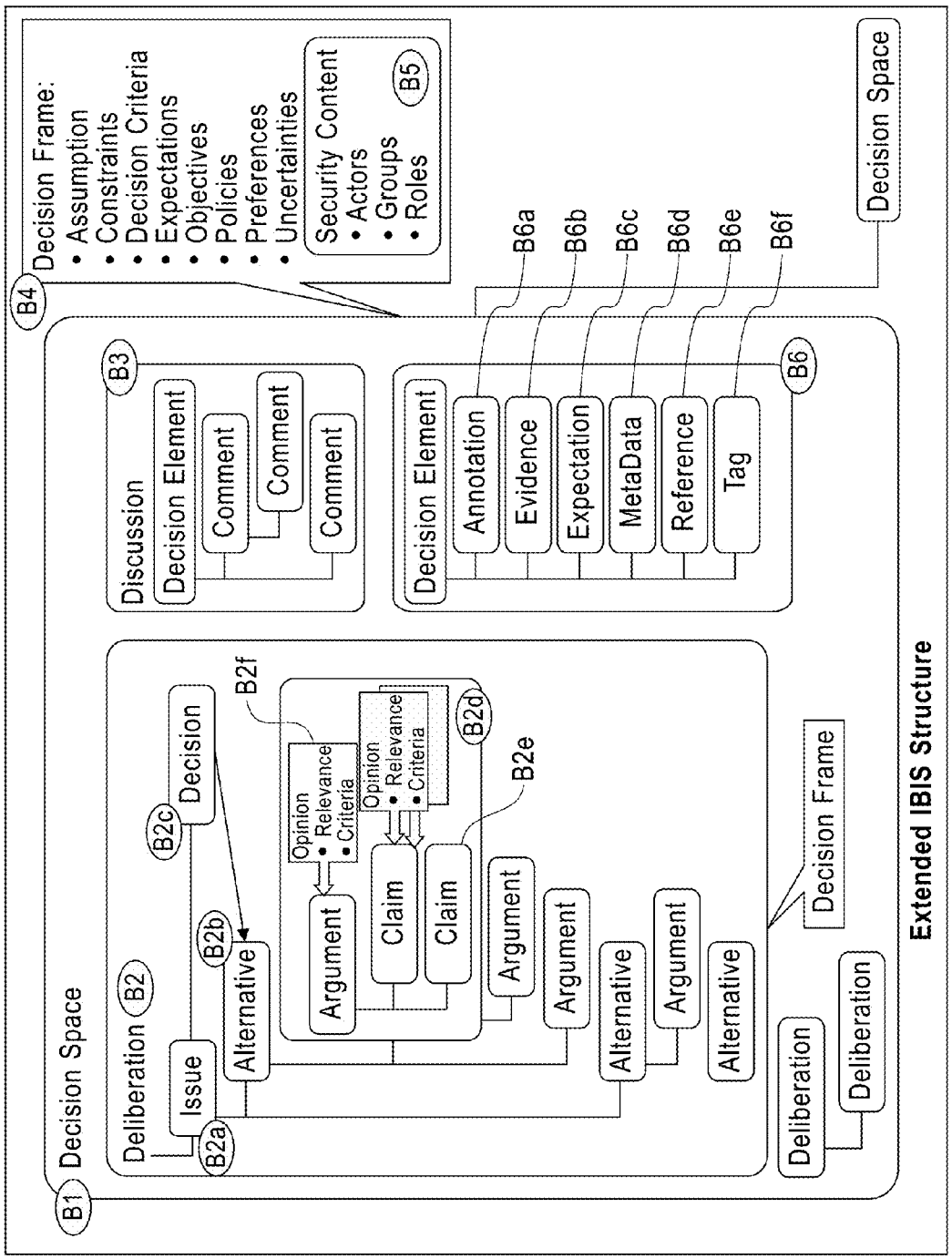
FIG. 7 illustrates a hierarchical data structure that represents individual postings and ratings in one embodiment.
Figure 8:
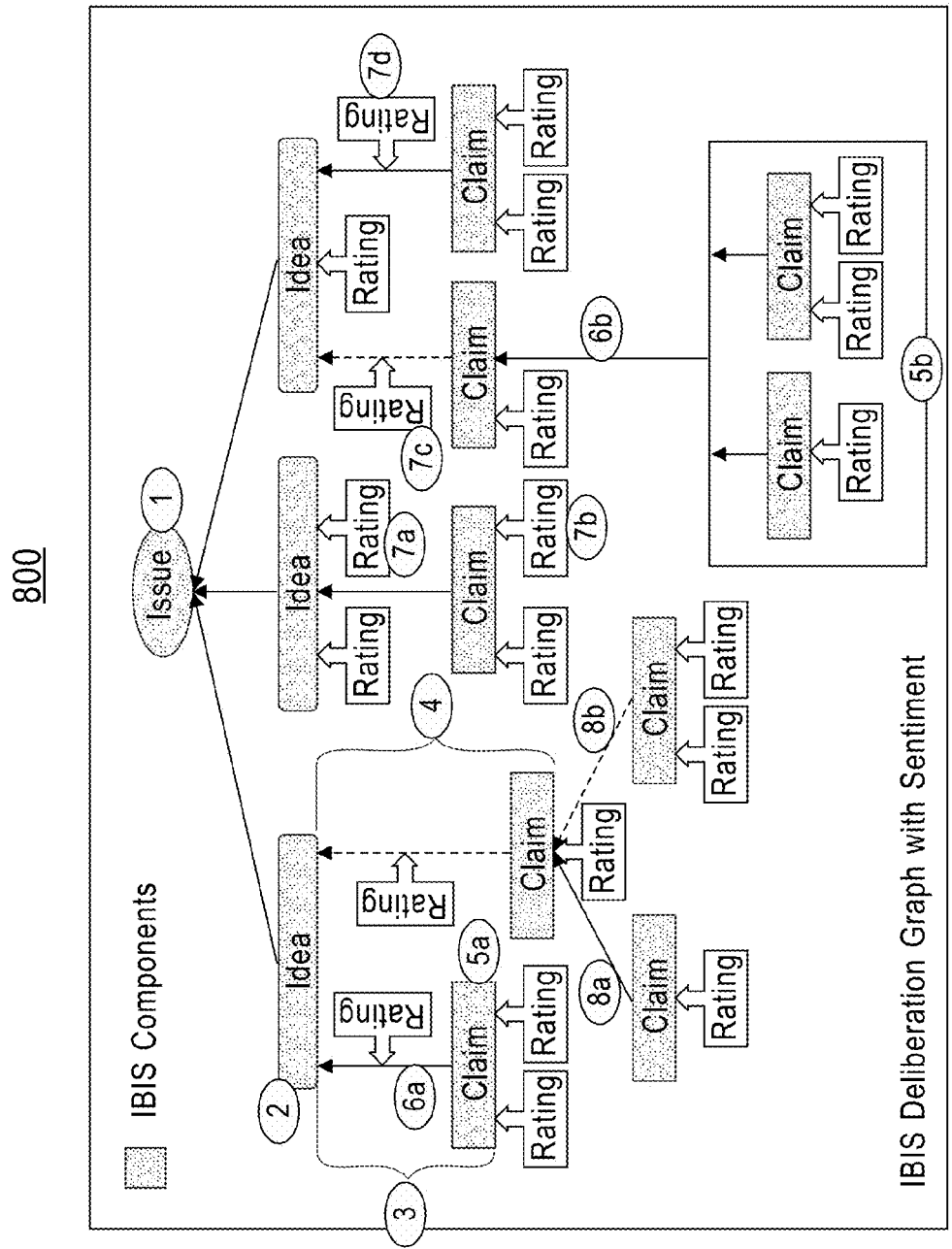
FIG. 8 illustrates a hierarchical data structure that represents individual postings and ratings in another embodiment.

At 110, the system 600 represents the received data in a hierarchical data structure as shown in FIG. 7 or FIG. 8. FIG. 7 illustrates a hierarchical data structure 700 formed in the system to represent individual postings and ratings. The hierarchical data structure 700 may include, but are not limited to: a decision space (B1), one or more deliberations e.g. deliberation labeled (B2), one or more issues (B2a), one or more alternatives, i.e., idea, (B2b), a decision (B2c), one or more arguments (B2d), a discussion (B3), a decision frame (B4), a security context (B5), and a decision element (B6). The decision space (B1) may include, but is not limited to one or more deliberations (B2).

A deliberation may include, but is not limited to: an issue (B2a) being considered by users, one or more alternatives (B2b) being debated from which one or more alternatives are chosen as the decision (B2c) to resolve the issue. Each alternative, i.e., each idea, may be associated with one or more arguments (B2d) which may support or rebut that particular alternative. A degree of the supporting or rebutting may be expressed by a corresponding strength value (e.g., ratings 500 shown in FIG. 5). An argument (B2d) may include, but is not limited to: claims (i.e., sub-arguments) (B2e) and opinions (B2f) expressing sentiment about truth or relevance or decision criteria of that argument. An argument may be decomposed into sub-arguments. A deliberation can also be decomposed into sub-deliberations.

The discussion (B3) may include, but is not limited to: one or more threaded comments (i.e., a reply to another comment). The decision frame (B4) manages decision elements used to guide or motivate the decision making process. The decision elements included in the decision frame (B4) may include, but are not limited to: assumptions, constraints, decision criteria, expectations, objectives, policies, preferences, triggers, and uncertainties. The decision frame (B4) also manages the security context (B5) for contents in the decision space. The security context (B5) determines capabilities that authorize users or groups of users to affect a change in the decision space based on roles associated with them. The decision frame (B4) can be associated with any elements of the deliberation or the discussion to provide the security context (B5). Discussion comments can further be associated with elements in the decision space. Other elements (B6) that can be associated with the elements in the decision space may include, but are not limited to: (a) annotations (B6a) for editorial commentaries or reminders; (b) evidence (B6b) to help back up elements in the deliberation (B2); (c) expectations (B6c) about an outcome of the deliberation (B2); (d) metadata (B6d) to store additional facts or other related, categorized information; (e) references (B6e) to information sources to provide more detailed explanations; and (f) tags (B6f) to associate semantic classifiers with the elements in the decision space (B1).

FIG. 8 illustrates a hierarchical data structure 800 by which user sentiments expressed against an issue are collected and represented. This hierarchical data structure 800 may include, but is not limited to: an issue (1) for a deliberation and a plurality of competing ideas (2) to resolve the issue. An idea represents a position for how the issue (1) could be resolved. Each of the ideas (2) can have supporting arguments (3) as well as rebutting arguments (4). An argument is a supporting argument of an idea if the argument increases a strength value of that idea. An argument is a rebutting argument of an idea if the argument decreases a strength value of that idea. A strength value of an idea is an aggregation of indirect strength values and direct strength values associated with that idea. An exemplary technique for aggregating the strength value is discussed in more detail below. An indirect strength value refers to herein a strength value of an argument associated with that idea. A direct strength value refers to herein a strength value expressed on that idea.

An argument may include, but is not limited to: one or more claims (5a, 5b) and one or more relationships (6a, 6b) indicating whether the claims (5a, 5b) supports (shown as a solid arrow in FIG. 7) or rebuts (shown as a dashed arrow in FIG. 7) an idea or another argument. Any idea, claim, or supporting or rebutting relationship can be rated (e.g., see rating examples 7a-7d) by users during the deliberation, i.e., a process whereby users enter their individual postings (e.g., arguments and/or ideas, etc.) and ratings. The rating of an idea may represent the user's preference sentiment for that idea. A rating on a claim may represent the user's estimate of the truth of the claim. A rating on a relation may represent the user's estimate of the relevance of the argument formed by the claim(s) and relation. In one embodiment, a user can set one rating on an argument. A rating on an argument may represent an aggregation of strength values of all of the ratings of the sub-arguments of that argument. An argument may further include, but is not limited to: one or more supporting sub-arguments (8a) or one or more rebutting sub-arguments (8b). The system 600 represents an argument, i.e., a claim, as a node in the hierarchical data structure 800. The system 600 represents a sub-argument as a child node of a node that the sub-argument supports or rebuts. The system 600 represents a relationship, e.g., supporting sub-argument (8a) or rebutting sub-argument (8b), as an edge in the hierarchical data structure 800. The hierarchical data structure 800 can expand as one or more new users enter their individual postings, e.g., sub-arguments, arguments, ideas, etc. Similarly, the system 600 may perform decomposing an issue into sub-issues. The decision space (B1) may comprise one or more similar issues and their respective deliberations.

Figure 4:
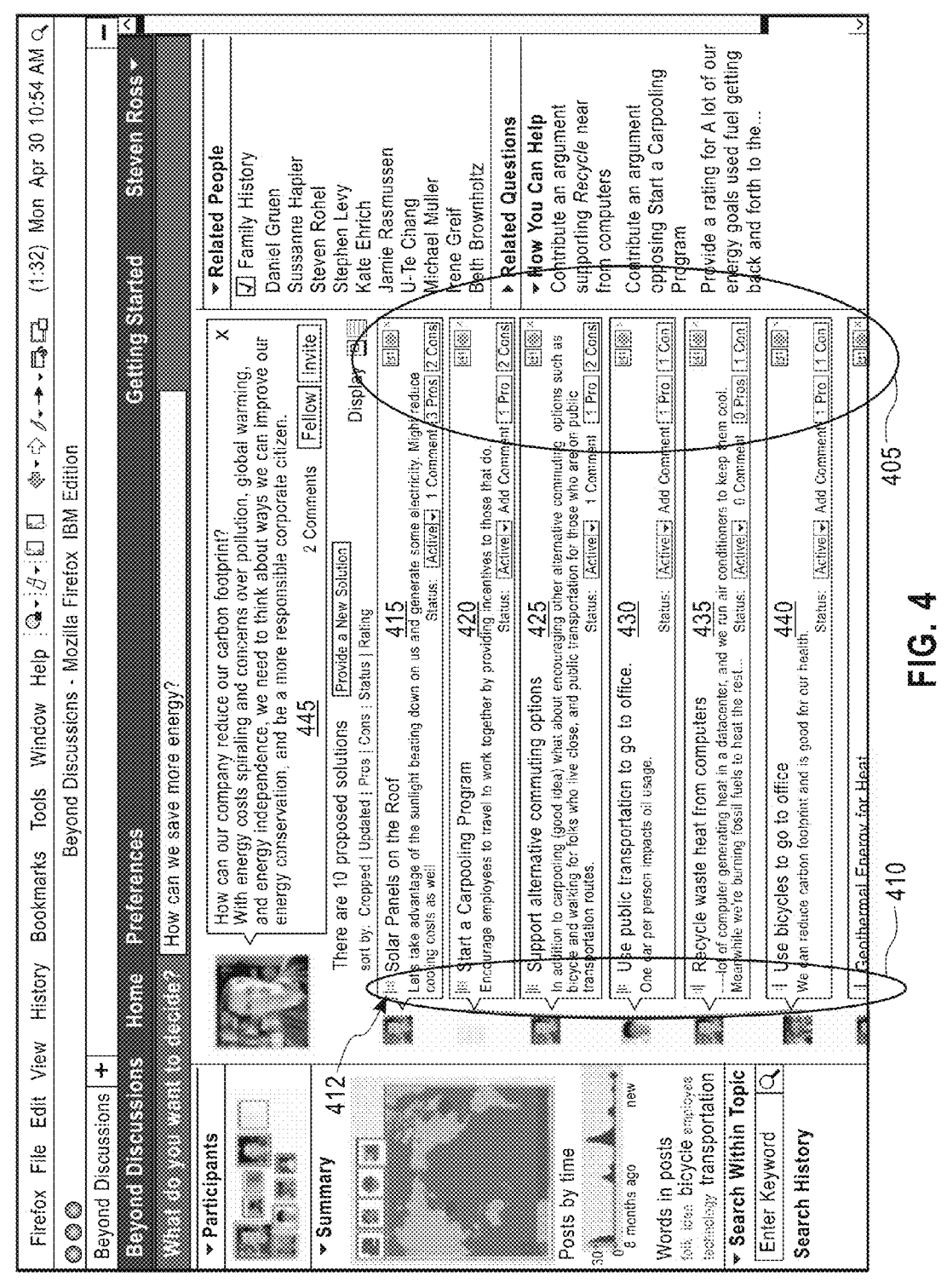

FIG. 4 illustrates an exemplary screenshot of a computer display device interface that depicts examples of received individual postings and corresponding example strength values in one embodiment. In FIG. 4, the system 600 enables a user to enter an issue 445, e.g., in the form of a statement of question, using an input device. The system 600 enables that user or other users to enter their individual postings 415, 420, 425, 430, 435, 440 which are ideas to resolve the issue 445. The system 600 may enable additional users to enter arguments that support or rebut the ideas as shown in 405. The system 600 indicates a strength value of each idea. A strength value of each idea indicates the aggregate strength computed from all the ratings of the idea and the tree of arguments and ratings connected to the idea and can take many display forms, e.g., a degree bar 410 indicating the strength value.

Figure 5:
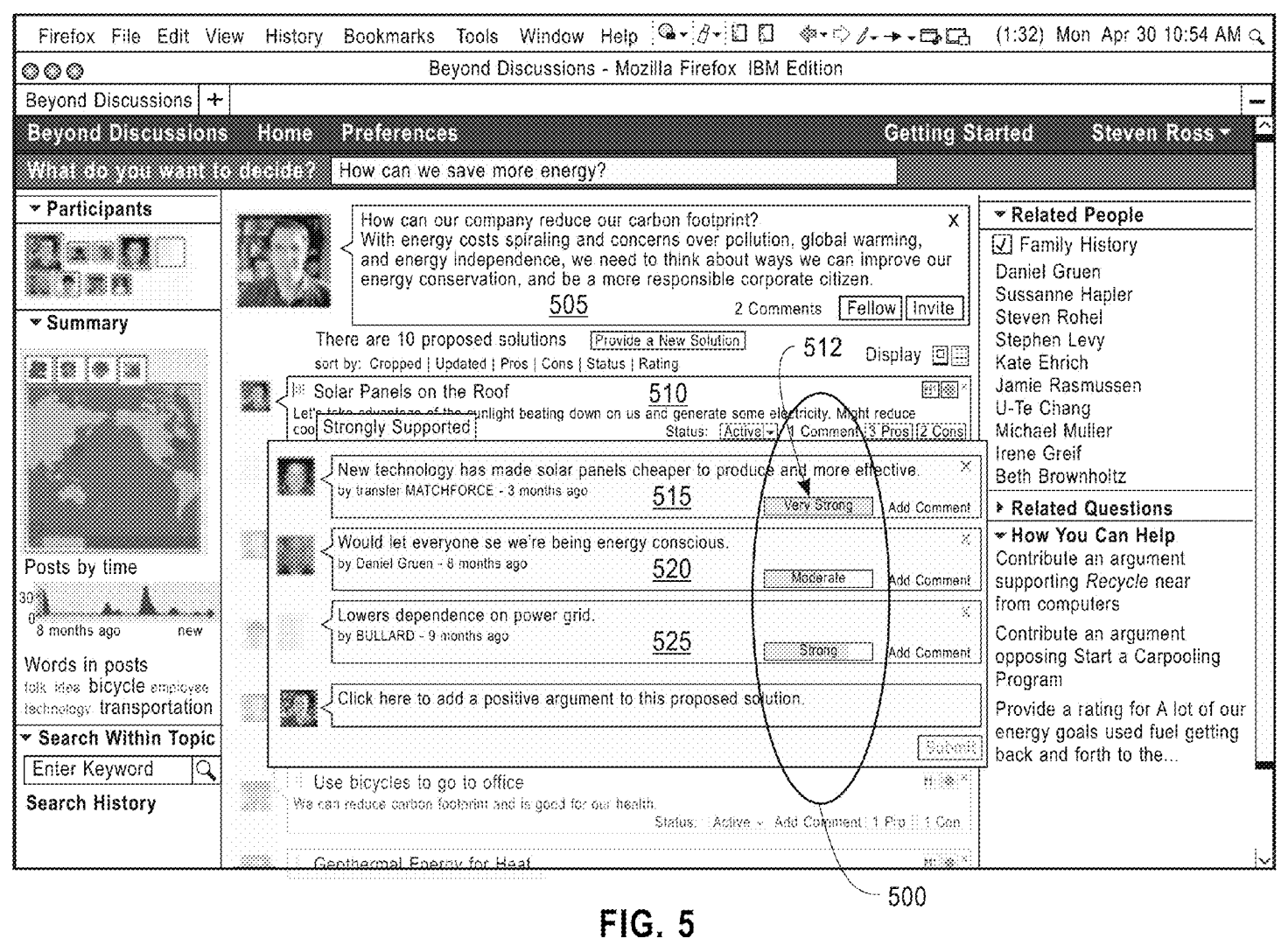

FIG. 5 illustrates an exemplary screenshot of the display device interface that depicts examples of individual postings and corresponding examples of strength values in another embodiment. In FIG. 5, the system 600 receives an issue 505, e.g., from a user. The system 600 further receives, from other users, respective individual postings 510 including respective ideas to resolve the issue 505. The system 600 may further receive additional individual postings, e.g., additional ideas, from additional users. For the idea 510, the system 600 receives arguments 515, 520, 525 and corresponding ratings 500. For example, as shown in FIG. 5, a user may enter an argument 515 with a rating that indicates a "very strong support" (e.g., a rating higher than a first threshold, e.g., 20) for the idea 510. Another user may enter an argument 520 with a rating that indicates a "moderate" (e.g., a rating lower than a second threshold, e.g., 10) support for the idea 510. Another user may enter an argument 525 with a rating that indicates a "strong" (e.g., a rating between the first threshold and the second threshold) support for the idea 510. Other possible rating values in this embodiment are "weak" and "very weak" (not shown), indicating an assessment that an argument is relatively unconvincing.

Returning to FIG. 1, at 120, the system 600 aggregates, through the hierarchical data structure 700 or 800, the strength values of the individual postings. In order to aggregate the strength values, the system 600 accumulates strength values of corresponding child nodes in the hierarchical data structure to come up with a strength value of a node in the hierarchical data structure. How to accumulate strength values is described in detail below. The first-type relations (e.g., relations indicating a supporting argument) increase the aggregated strength values, and the second-type relations (e.g., relations indicating a rebutting or opposing argument) decrease the aggregated strength values. The system 600 may be able to sort individual postings according to aggregated strength values. For example, the individual posting which has the highest aggregated strength value may become the first in the sorting. The individual posting which has the lowest aggregated strength value may become the last in the sorting. Based on the sorting and the aggregation of strength values, the system 600 may be able to identify which idea is most compelling, i.e., an idea whose aggregated strength value is highest. The system 600 may be able to identify which argument is most persuasive to support an idea, i.e., an argument whose aggregated strength value is highest. At 130, the decision is made by the participants or by a designated decision maker based on the aggregated strength values. For example, the system 600 may notify users that the idea that gained the highest aggregated strength value is chosen to resolve a corresponding issue.

Figure 6:
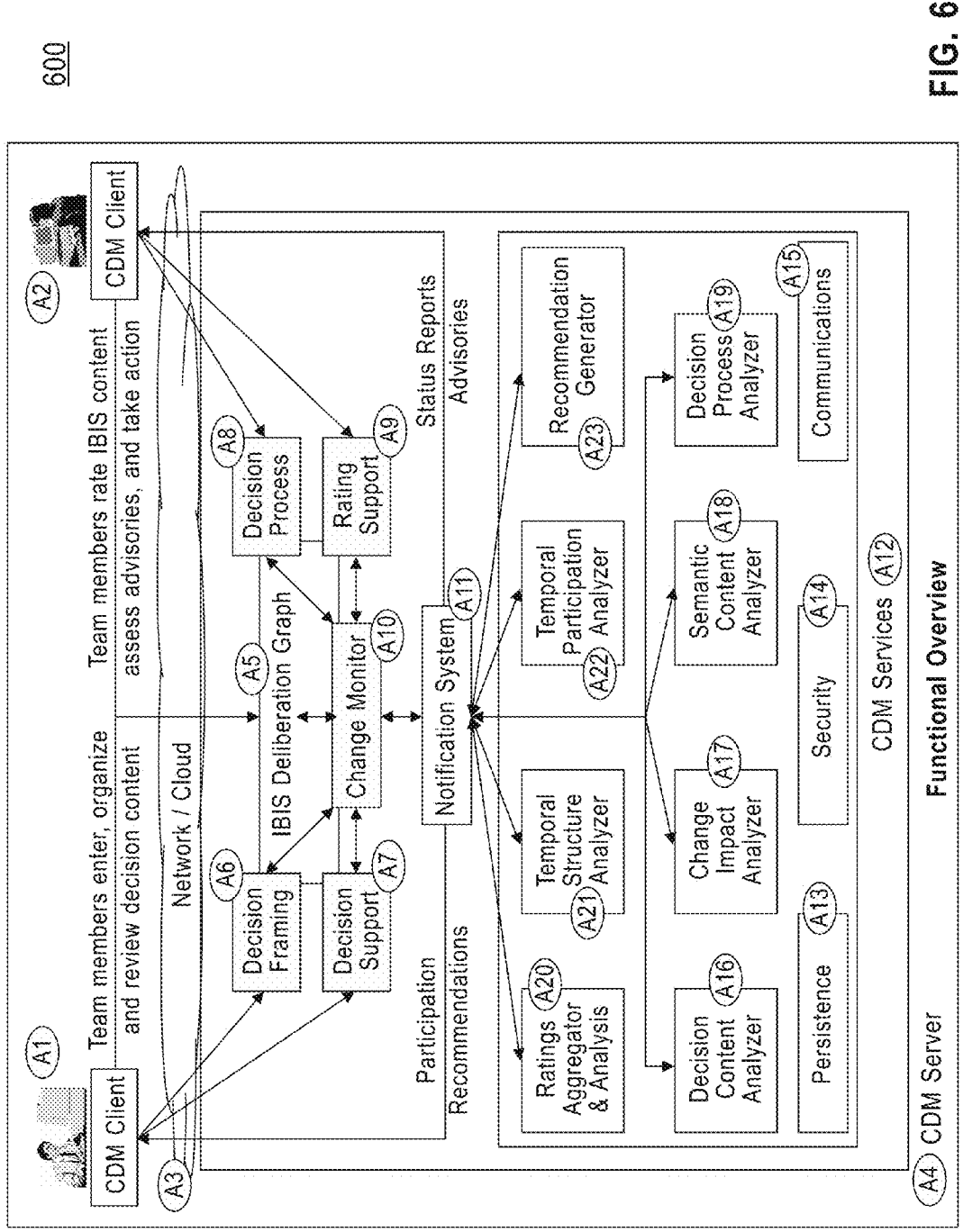
FIG. 6 illustrates a system diagram for a collaborative decision making in one embodiment.

FIG. 6 illustrates a system diagram of the system 600 in one embodiment. Users use client devices (e.g., A1 or A2) and implement wired or wireless communications to communicate with a server device A4 that hosts the deliberation of a decision making. The server device A4 provides visualization and navigation of the decision space. The server device A4 provides, synchronously and asynchronously, recommendations and/or advisories to the client devices via a network (e.g., a wired or wireless network) A3. The server device A4 provides a plurality of decision orchestration services A16-A23 and data which may include, but are not limited to:

the hierarchical data structure 700 or 800 (A5), which comprises elements in the decision space and relations among these elements that form one or more deliberations (e.g., issues, alternatives, arguments, claims, evidence, assumptions, relations, comments) described in more detail above in conjunction with FIG. 7);

Decision Framing (A6)—providing data used to guide the users in the deliberation, e.g., a document that describes how a user can participate in the deliberation, and further data used to motivate users to participate in the deliberation, e.g., an email sent to users to encourage participation in the deliberation);

Decision Support (A7)—providing data including, but not limited to: data associated with brainstorming, data representing strength values, and data representing voting results;

Decision Process (A8)—providing data including, but not limited to: a schedule to make a decision, milestones associated with a decision to be made, stages to make the decision, status associated with a decision to be made, qualifications and rules governing a notification and a participation associated with a corresponding decision making; and Rating Support (A9)—providing data associated with strength values, and data associated with aggregating strength values.

A Change Monitor component (A10) implements programmed components such as software routines or functions to monitor any data creation, alteration, or deletion in the decision space. Upon detecting any change in the decision space, the Change Monitor component (A10) directs Notification System (A11) to inform Collaboration Decision Making (CDM) Services component (A12) that analyzes the change or performs one or more tasks of:

Persistence (A13) to permanently store, cache, and retrieve data (i.e., data associated with the decision space);

Security (A14) protecting against unauthorized data access or alteration, e.g., by using an authentication to access the server device (A4); and Communications (A15) streaming and packetized data transfer between CDM Services component (A12), client's device (A1-A2), and the server device (A4).

Other decision orchestration services may include, but are not limited to:

Decision Content Analyzer (A16) implementing programmed components such as logic routines and software or mathematical functions to interpret a decision content (e.g., classifying an individual posting as one of: an idea, an argument or a sub-argument) and a decision process organization (e.g., representing individual postings and ratings in a hierarchical data structure) to determine whether recommendations asking the client devices to add individual postings and ratings shall be sent to the client devices;

Change Impact Analyzer (A17) implementing programmed components such as logic routines and software or mathematical functions to assess changes in assumption status, criteria weights, or uncertainty probabilities relating elements in the decision space to determine whether the client devices should be notified to reevaluate portions of the deliberation impacted by the change and initiate communicating a notification to one or more users whose interests may be affected by the changes. For example, users who supported an idea based on the assumption that the idea is true can be notified that the changes indicate that the assumption is false.

In another embodiment, a change associated with an individual posting and/or a strength value is detected, such as when a user changes his/her individual posting and his/her indication of strength value. Then, the system 600 may notify one or more of other users of the change.

Semantic Content Analyzer (A18) implementing programmed components such as logic routines or mathematical functions to determine whether to recommend consolidation or reorganization of elements in the decision space, while maintaining semantic meanings of words and phrases used in the deliberation, e.g., by consolidating all the supporting sub-arguments for an argument and/or consolidating all the rebutting arguments for an idea;

Decision Process Analyzer (A19) implementing programmed components such as logic routines or mathematical functions to review a change in an individual posting and/or in the decision space. Decision Process Analyzer generates notifications for participation and/or change in the status of decision elements (e.g., altering whether or not content is still able to be changed by participants based on a schedule associated with a decision to be made);

Ratings Aggregator & Analyzer (A20) implementing programmed components such as logic routines or mathematical functions to manage the aggregation of strength values and/or individual postings, which may include, but is not limited to: a vertical aggregation of sub-arguments in the hierarchical data structure and a horizontal aggregation across similar arguments in the hierarchical data structure; analyzes relative strength values of peer arguments and a composition of the decision space to identify contentious arguments (i.e., arguments whose sub-arguments are divided relatively equally between supporting sub-arguments and rebutting sub-arguments) and disparate arguments (e.g., supporting argument which is dissimilar from other supporting arguments—similarity value may be calculated by using a known similarity calculation technique. For example, document clustering methods such as "Agglomerative Hierarchical Clustering" or "K-means" which represent posts as term frequency vectors, could be used to group similar ideas or arguments;

Temporal Structure Analyzer (A21) implementing programmed components such as logic routines or mathematical functions to identify dependencies for risk analysis and evolution of the deliberation, e.g., an argument is made based on an assumption that an idea is true; e.g., a sub-argument supports an argument—the strength value of an argument depends on strength values of sub-arguments supporting or rebutting the former argument;

Temporal Participation Analyzer (A22) implementing programmed components such as logic routines or mathematical functions to analyze users' contributions based on contents of their individual postings, a structure of the hierarchical data structure, and their strength values. Temporal Participation Analyzer (A22) implements programmed components such as logic routines or mathematical functions to identify relationships, contributions, expertise, and/or potential interest of the users, e.g., based on the structure of the hierarchical data structure and the strength values; and Recommendation Generator (A23) receiving communicated notifications from other components in the system 600 and generating recommendations and/or advisories to users. The recommendations and/or advisories may be related to a participation of the deliberation or a process of the deliberation.

Figure 3:
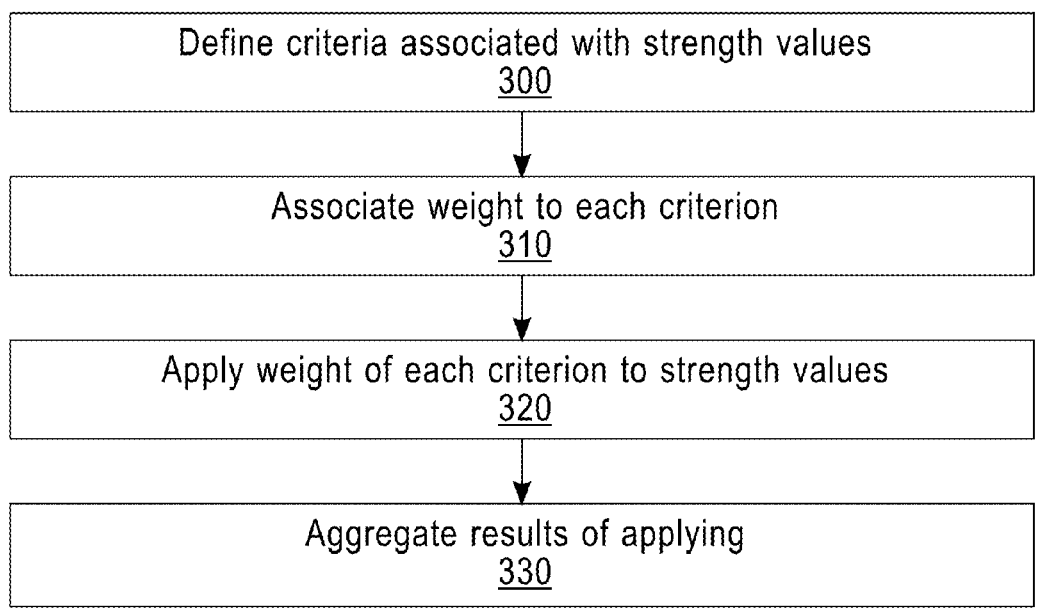
FIG. 3 illustrates a method for aggregating strength values in one embodiment.
Figure 9:
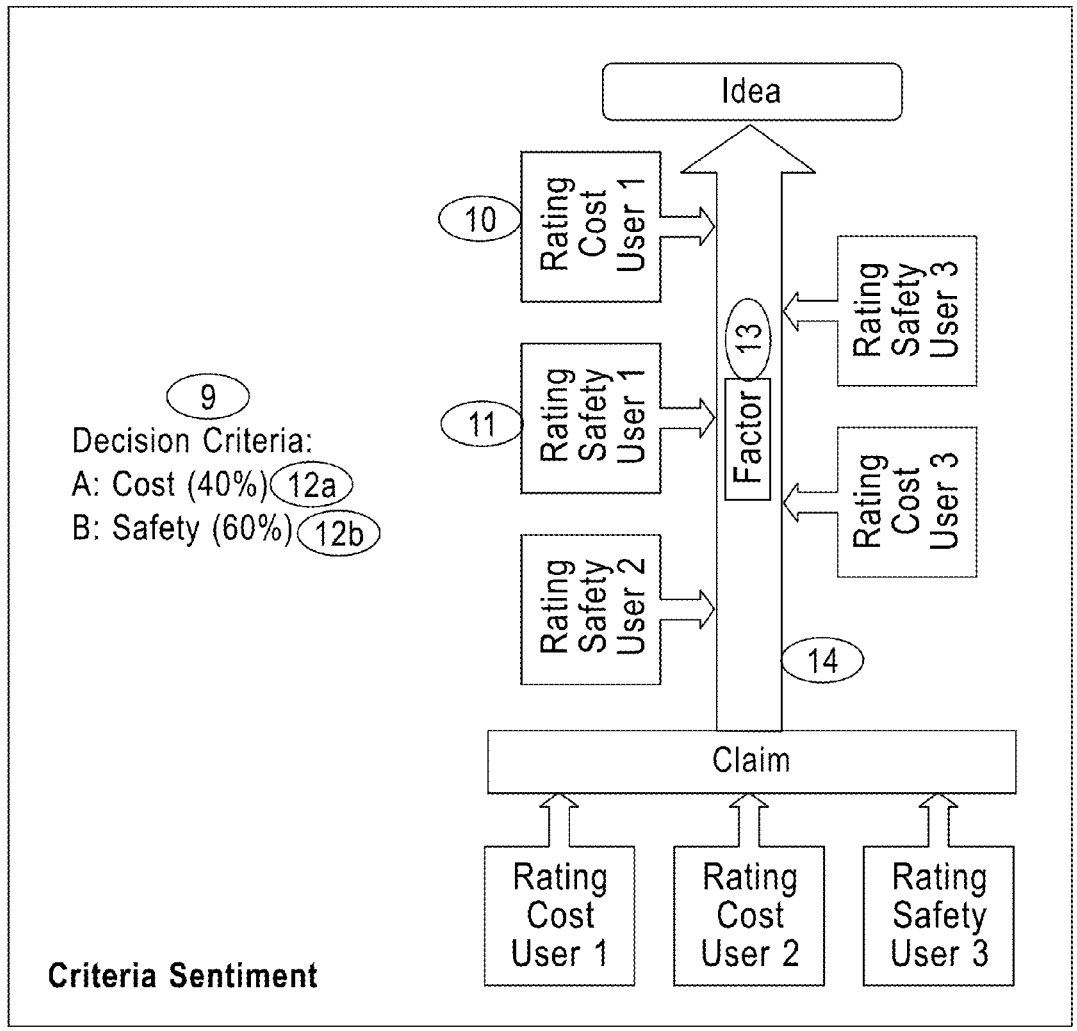
FIG. 9 illustrates weights and criteria associated with ratings in one embodiment.

FIG. 9 illustrates weights and criteria associated with strength values in one embodiment. As shown in FIG. 9, a strength value may be associated with a criterion (9) (e.g., cost (10), safety (11), etc.). FIG. 3 illustrates a flowchart that describes a computer-implemented method for associating a strength value with a criterion. At 300, the system 600 defines criteria associated with the strength values. Examples of criteria may include, but are not limited: cost (12*a*), safety (12*b*), etc. At 310, the system 600 implements methods programmed to associate a weight to each criterion. For example, the system 600 may assign "0.6" to cost (12*a*) and "0.4" to safety (12*b*). At 320, the system 600 may apply the weight of each criterion to a strength value, e.g., by multiplying a corresponding weight with a corresponding strength value. At 330, the system 600 aggregates results of the applying. The aggregated results represent an evaluation of a corresponding idea by the users. The system is equipped with logic routines or functions for choosing an idea whose aggregated strength value is the highest as a decision to a corresponding issue. The system 600 analyzes contributions of the users to the decision based on one or more of: (1) contents of the individual postings; (2) a structure of the hierarchical data structure; or (3) the strength values.

Alternatively, the system 600 may use other methods to evaluate the corresponding idea. Furthermore, when a user enters an individual posting, the user may also enter a degree (13) of a support or an opposition to a corresponding idea or argument. For example, when a user enters an argument that suggests another argument is true or relevant, that user may express less degree of support to the other argument than a user who enters an argument that fully supports the other argument. A user who enters a questioning or skeptical argument against another argument may express less degree of an opposition than a user who expresses an argument intended to fully rebut the other argument.

The system 600 computes a strength value of a node, e.g., by aggregating strength values of child nodes. This process is further defined below. The system 600 computes a strength value of an idea based on ratings of the idea that represent evaluations of the idea from users as well as based on strength values of supporting and rebutting arguments for the idea, e.g., by combining the strength values of those arguments. When aggregating strength values, the system 600 performs the aggregation based on one or more properties of:

1. An evaluation of strength of an individual posting may be a function of corresponding strength values (i.e., strength values on that individual posting and strength values of arguments associated with the individual posting) and the number of the strength values. An impact of additional ratings decreases as the number of ratings increases (e.g. if there are four ratings, a $5^{th}$ rating will have a larger incremental impact than the $101^{st}$ rating would have if there were already 100 ratings);
2. Supporting arguments may only increase strength values of a corresponding argument (i.e., a parent node), while rebutting arguments may only decrease strength values of the corresponding argument;
3. Cooperating arguments may be combined to reinforce their conclusions. For example, a large number of weak arguments (e.g., arguments with low positive strength values, e.g., one in a scale of 0 to 10) can be as persuasive as a small number of strong arguments (e.g., arguments with high strength values, e.g., nine (9) on a scale of 0 to 10);

4. Additional incremental arguments may have diminishing impact (e.g. the 101$^{st}$ argument added in favor of an idea will not make as much difference as adding the 5$^{th}$ argument did); and 5. Competing arguments reduce a strength value of a corresponding argument; for example, competing arguments do not simply cancel out (e.g. five supporting arguments and four opposing arguments do not have the same impact as one supporting argument).

In one embodiment, to perform the aggregation of the strength values with these properties, the system 600 treats ratings like scores that represent persuasiveness of arguments or ideas. In one embodiment, a rating is between 0.0 and 1.0, and the mapping is:
Very Strong=1.0,
Strong=0.75,
Moderate=0.5
Weak=0.25
Very Weak=0.0.

The system 600 computes a strength value for each individual posting that represents a collective score for persuasiveness of that individual posting or a degree of relevancy of that individual posting.

To aggregate ratings on an individual posting, the system 600 computes a mean value (e.g., an arithmetic mean, a geometric mean, etc.) of the ratings on that individual posting, attenuated by a weighting factor based on the number of ratings that were used to compute the mean value. The weighting factor reflects how a collective confidence in aggregated ratings increases as the numbers of one or more of the ratings becomes larger (as shown by the relation in equation 1):

$$Re_i = (1 - 1/\log 2(n+2))((\Sigma r i_j)/n) \quad \text{Equation (1)}$$

where $Re_i$ represents an aggregated strength value of an individual posting, $ri_j$, j=1, ..., n, where n is the number of ratings on that individual posting, j is the jth rating, and the $(1-1/\log 2(n+2))$ represents the weighting factor applied to the $((rij)/n)$, which is just the arithmetic average of the n ratings.

The system 600 performs this aggregation set forth in equation 1) for each strength value for each particular decision criterion and combines strength values based on criteria. Hence, a user can rate an idea, for example, against a variety of elements or criteria (e.g. cost, risk, time to complete, etc) and separately compute aggregated strength values for these different elements. In the end, to compute an overall score, these different strength values can be combined using a weighting scheme that represents the relative importance of these criteria in choosing an ultimate solution. For example, if cost is more important than time-to complete, the cost strength would be weighted higher when deciding on an overall strength value of a proposal. In one embodiment, the system 600 aggregates the strength values based on attributes of users (e.g., their department, or business role, or subject matter expertise). For example, the system 600 may aggregate strength values per department, business role or subject matter expertise To compute a strength value of a claim that is supported by some number of "supporting" arguments and opposed by some number of "rebutting" arguments, the system 600 first computes the probability (Q1) that the claim is false despite all the supporting arguments for the claim (e.g., the effect if all the supporting arguments are wrong), and the probability (Q2) that the claim is true despite all the rebutting arguments against the claim (e.g., the effect if all the rebutting arguments are wrong):

$$Q1 = \Pi(1 - Rp_i) \quad \text{Equation (2)}$$

$$Q1 = \Pi(1 - Rc_i) \quad \text{Equation (3)}$$

where $Rp_i$ refers to a strength value of each individual posting that supports that claim, and $Rc_i$ refers to a strength value of each individual posting that rebuts that claim. i refers to an identification for each individual posting. Each $Rp_i$ and $Rc_i$ are computed by equation (1), e.g., by replacing $Re_i$ with $Rp_i$ or $Rc_i$. Once the system 600 has these two quantities (i.e., Q1 and Q2) computed for an idea, a conviction (C) in that idea is computed as the probability that the idea is true based on the supporting arguments:

$$C = 1 - Q1 \quad \text{Equation (4)}$$

and a doubt (D) in the claim as the probability that the idea is false based on the opposing arguments:

$$D = 1 - Q2 \quad \text{Equation (5)}$$

An aggregated strength value (S) of an individual posting (i.e., idea or argument) is then defined on a scale between 0.0 and 1.0 by combining the conviction and the doubt as follows:

$$S = (1 + C - D)/2 \quad \text{Equation (6)}$$

In this scale, if S is below 0.5, that indicates that at the aggregated strength value the idea is opposed. If S is above 0.5, that indicates that the idea is supported. If S is equal to 0.5, that indicates neutrality or ambivalence. S is not a probability but represents whether an idea is supported or opposed.

In one embodiment, if an individual posting has both sub-arguments and direct ratings, the system 600 aggregates the ratings and treats the aggregation as an additional phantom argument associated to that individual posting. Accordingly, a particular posting can be both rated directly and argued for/against, and both of these indications of the strength of the posting must be combinable. In one embodiment, the direct ratings are treated as an anonymous argument, so that saying "I like it" but not giving a reason is treated identically to saying "I like it" for a particular stated reason. In this approach, the phantom argument is effectively "I just like it". For example, negative ratings could be aggregated and the aggregation can be treated as an extra argument opposing a corresponding individual posting (e.g., allowing users to express sentiment against a particular idea).

Whenever an element in the decision space is modified, for example, through an addition of an additional argument or rating or a revision of an existing rating, there is responsively computed new aggregation scores, i.e., new aggregated strength values as follows. The aggregation mechanism can avoid re-computing all strength values, e.g., by following dependencies inherent in the hierarchical data structure 700 or 800, and only re-computing those strength values that are dependent on the modified portions of the hierarchical data structure. The aggregation mechanism propagates the strength value updates through the affected subset of the hierarchical data structure, leaving most of the already calculated strength values untouched in most cases.

Computation for updating of the strength values can be further minimized by maintaining intermediate strength values throughout the hierarchical data structure and using them to perform incremental updates, i.e., an update of a strength value causes only updates on strength values which are directly or indirectly connected through the hierarchical data structure. For example, if a sum of all strength values of an argument is maintained in a corresponding node, then a new strength value or a change to a strength value can be used to update this sum and re-compute a mean strength value without a need to re-compute all the strength values in order to compute the sum. Likewise, Q1 and Q2 probability values can be maintained and incrementally updated rather than being re-computed from strength values stored in leaf nodes in the hierarchical data structure.

Figure 2:
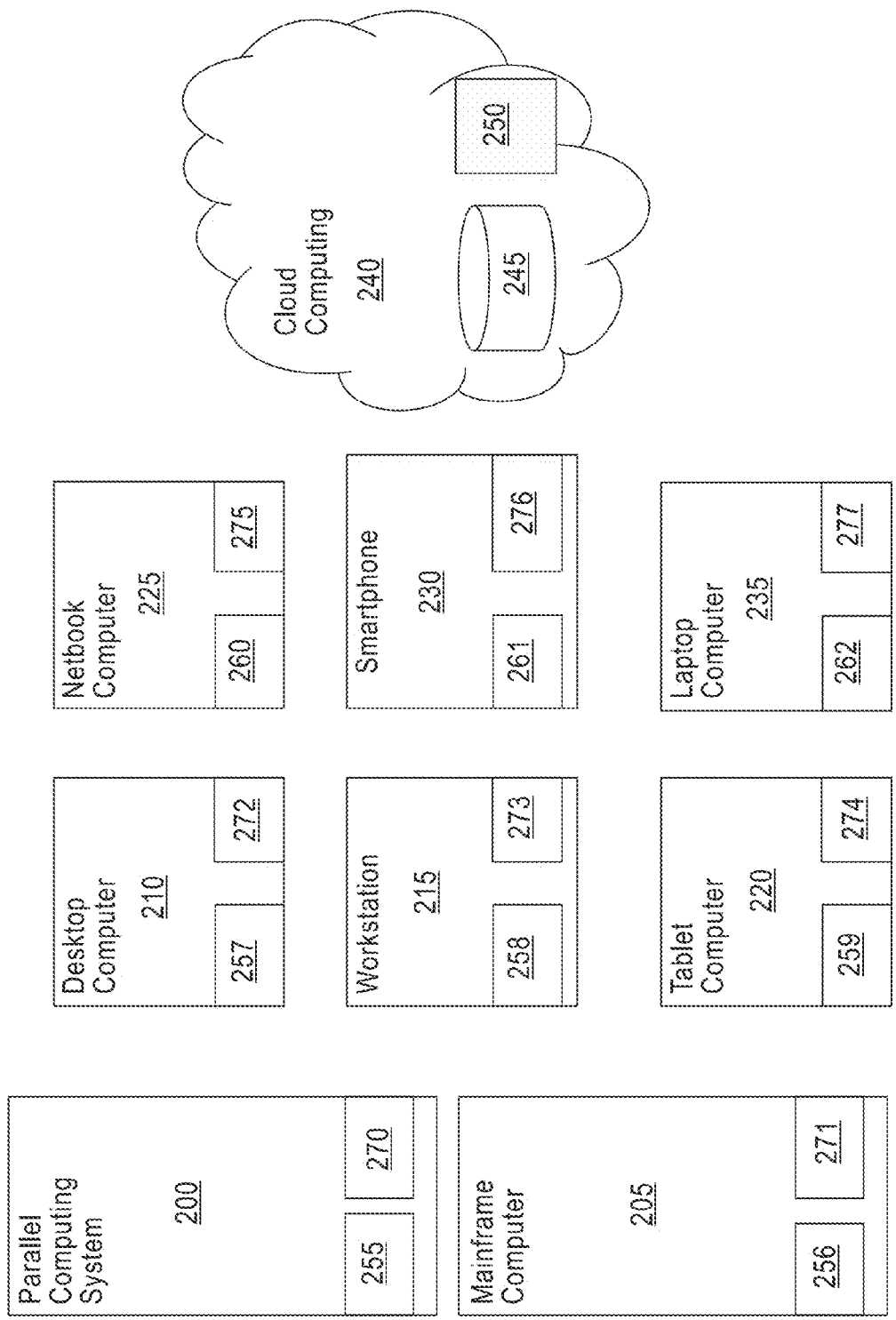
FIG. 2 illustrates exemplary computing systems that can run the methods illustrated in FIGS. 1 and 3 in one embodiment.

FIG. 2 illustrates exemplary computing systems on which the system 600 can be implemented. These exemplary computing systems may include, but are not limited to, a parallel computing system 200 including at least one processor 255 and at least one memory device 270, a mainframe computer 205 including at least one processor 256 and at least one memory device 271, a desktop computer 210 including at least one processor 257 and at least one memory device 272, a workstation 215 including at least one processor 258 and at least one memory device 273, a tablet computer 220 including at least one processor 256 and at least one memory device 274, a netbook computer 225 including at least one processor 260 and at least one memory device 275, a smartphone 230 including at least one processor 261 and at least one memory device 276, a laptop computer 235 including at least one processor 262 and at least one memory device 277, or a cloud computing system 240 including at least one storage device 245 and at least one server device 250.

In one embodiment, the methods shown in FIGS. 1 and 3 may be implemented as hardware on a reconfigurable hardware, e.g., FPGA (Field Programmable Gate Array) or CPLD (Complex Programmable Logic Device), by using a hardware description language (e.g., Verilog, VHDL, Handel-C, or System C). In another embodiment, the methods shown in FIGS. 1 and 3-4 may be implemented on a semiconductor chip, e.g., ASIC (Application-Specific Integrated Circuit), by using a semi custom design methodology, i.e., designing a semiconductor chip using standard cells and a hardware description language.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store, a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for facilitating collaborative decision making, the method comprising:

receiving, at a computer system, data representing one or more individual postings and ratings associated with the individual postings, the data associated with a deliberation to make a decision;

representing the received data in a hierarchical data structure;

aggregating, through the hierarchical data structure, the ratings associated with the individual postings to obtain strength values;

facilitating collaborative decision making based on the strength values; and receiving a change associated with the individual postings or the ratings and notifying at least one user of the change, wherein the change is a change of an assumption that an idea is true to an assumption that the idea is false and wherein the notifying is to each user who had supported the idea based upon the assumption that the idea is true;

wherein a processor unit coupled to a memory device in the computer system performs the receiving the data, the representing, the aggregating, the facilitating of the decision making and the receiving the change and notifying the users.

2. The method according to claim 1, wherein each individual posting comprises one or more of:

one or more issues, one or more ideas, one or more arguments, and one or more relations, associated with the decision making.

3. The method according to claim 2, wherein an idea is associated with one or more arguments including one or more claims and the one or more relations, the relations including a first-type relation that indicates that the claims support a corresponding argument and a second-type relation that indicates that the claims rebut the corresponding argument.

4. The method according to claim 3, wherein the ratings represent one or more of:

preferences of users for the idea;

a value indicating the users' degree of belief in truth or falseness of the claims; or evaluations of the corresponding argument.

5. The method according to claim 1, further comprising one or more of:

sorting the individual postings according to the strength values, and accumulating strength values of dependent child nodes in the hierarchical data structure to determine a strength value of a node in the hierarchical data structure.

6. The method according to claim 1, further comprising: analyzing contributions of users to the made decision based on one or more of:

contents of the individual postings;

a structure of the individual postings; and the ratings.

7. The method according to claim 3, wherein the aggregating the ratings comprises:

defining criteria associated with the strength values;

associating a weight to each criterion;

applying the weight of each criterion to the strength values; and aggregating results of the applying, wherein the aggregated results represent an evaluation of the idea by users.

8. The method according to claim 7, wherein the first-type relations increase the aggregated results, and the second-type relations decrease the aggregated results, and each individual posting and a corresponding rating have a different effect on the aggregated results.

9. The method according to claim 7, further comprising one or both of:

calculating a first probability that the idea is true based on the aggregated results; and calculating a second probability that the idea is false based on the aggregated results.

10. The method according to claim 9, further comprising: evaluating the idea based on one or both of the calculated first probability and the calculated second probability.

11. The method according to claim 7, further comprising: dynamically receiving one or more updates on the individual postings and the ratings; and re-computing the aggregated results based on the one or more updates.

12. A system for facilitating collaborative decision making, the system comprising:

a memory device; and a processor coupled to the memory device, wherein the processor is configured to perform:

receiving, at a computer system, data representing one or more individual postings and ratings associated with the individual postings, the data associated with a deliberation to make a decision;

representing the received data in a hierarchical data structure;

aggregating, through the hierarchical data structure, the ratings associated with the individual postings to obtain strength values;

facilitating the collaborative decision making based on the strength values; and receiving a change associated with the individual postings or the ratings and notifying at least one user of the change, wherein the change is a change of an assumption that an idea is true to an assumption that the idea is false and wherein the notifying is to each user who had supported the idea based upon the assumption that the idea is true.

13. The system according to claim 12, wherein each individual posting comprises one or more of:

one or more issues, one or more ideas, one or more arguments, and one or more relations, associated with the decision making.

14. The system according to claim 13, wherein an idea is associated with one or more arguments including one or more claims and the one or more relations, the relations including a first-type relation that indicates that the claims support a corresponding argument and a second-type relation that indicates that the claims rebut the corresponding argument.

15. The system according to claim 14, wherein the ratings represent one or more of:
- preferences of users for the idea;
- a value indicating the users' degree of belief in truth or falseness of the claims; or
- evaluations of the corresponding argument.

16. The system according to claim 12, wherein the processor is further configured to perform one or more of:
- sorting the individual postings according to the strength values, and
- in order to perform aggregating, accumulating strength values of dependent child nodes in the hierarchical data structure to determine a strength value of a node in the hierarchical data structure.

17. The system according to claim 12, wherein in order to perform the aggregating the ratings, the processor is further configured to perform:
- defining criteria associated with the strength values;
- associating a weight to each criterion;
- applying the weight of each criterion to the strength values; and
- aggregating results of the applying,
- wherein the aggregated results represent an evaluation of the idea by the users.

18. The system according to claim 17, wherein the processor is further configured to perform one or both of:
- calculating a first probability that the idea is true based on the aggregated results; and
- calculating a second probability that the idea is false based on the aggregated results.

19. A computer program product for facilitating a collaborative decision making method, the computer program product comprising a computer readable storage medium readable by a machine and storing instructions run by the machine to perform a method, said method steps comprising:
- receiving, at a computer system, data representing one or more individual postings and ratings associated with the individual postings, the data associated with a deliberation to make a decision;
- representing the received data in a hierarchical data structure;
- aggregating, through the hierarchical data structure, the ratings associated with the individual postings to obtain strength values; and
- facilitating the collaborative decision making based on the strength values; and
- receiving a change associated with the individual postings or the ratings and notifying at least one user of the change, wherein the change is a change of an assumption that an idea is true to an assumption that the idea is false and wherein the notifying is to each user who had supported the idea based upon the assumption that the idea is true.

20. The computer program product according to claim 19, wherein each individual posting comprises one or more of:
- one or more issues, one or more ideas, one or more arguments, and one or more relations, associated with the decision making.

21. The computer program product according to claim 20, wherein an idea is associated with one or more arguments including one or more claims and the one or more relations, the relations including a first-type relation that indicates that the claims support a corresponding argument and a second-type relation that indicates that the claims rebut the corresponding argument.

* * * * *